UNITED STATES PATENT OFFICE.

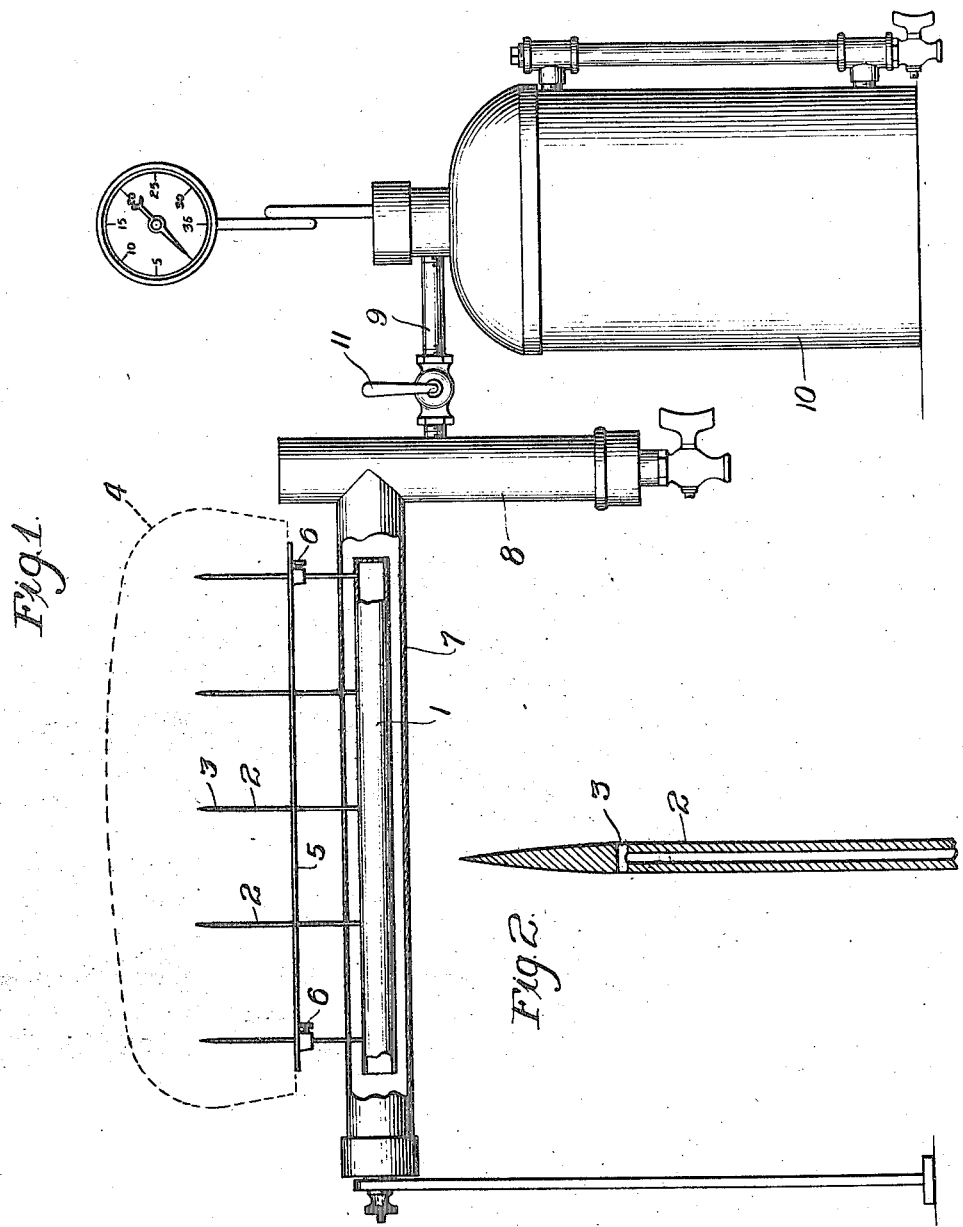

WALTER H. TOMLINSON, OF CHICAGO, ILLINOIS.

PROCESS OF COOKING OR TREATING FOOD.

1,152,241. Specification of Letters Patent. Patented Aug. 31, 1915.

Application filed March 7, 1914. Serial No. 823,214.

*To all whom it may concern:*

Be it known that I, WALTER H. TOMLINSON, a citizen of the United States, residing at Chicago, county of Cook, State of Illinois, have invented a certain new and useful Improvement in Processes of Cooking or Treating Food, and declare the following to be a full, clear, and exact description of the same, such as will enable others skilled in the art to which it pertains to make and use the same, reference being had to the accompanying drawings, which form a part of this specification.

There are two aspects to my invention one having to do with the cooking of food and the other with restoring the freshness of food previously cooked.

Considered in one of its aspects, my invention may be said to have for its object a novel method whereby food may be cooked from the inside outwardly instead of from the outside toward the center.

Viewed in its second aspect, my invention may be said to have for its object to produce a simple and novel method for restoring the freshness of stale bread or pastry products or of warming comparatively fresh products.

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is a side elevation of an apparatus adapted to carry out my method and designed with special reference to restoring the freshness of bread or the like or for warming the same just before it is served to be eaten, the parts being shown in section; and Fig. 2 is a section on an enlarged scale through one of the hollow needles through which the cooking or warming and freshening element is supplied.

Broadly speaking, my invention consists in introducing the cooking medium into the body of the food to be cooked instead of applying the cooking medium solely to the external surfaces of the food. In order that satisfactory results may be obtained, the heating medium should be introduced at a considerable number of points distributed throughout the mass of the food to be cooked or treated. A simple form of apparatus for carrying out my method consists of a plurality of hollow needles having discharge outlets through the sides, the needles serving as a support for the food to be treated or projecting from a support for food or into a receptacle adapted to contain the food; means being provided for supplying steam or heated air, or both to the needles so that it will be discharged by the needles into the body of the food to be cooked or treated.

For the sake of brevity, I have illustrated in the drawing merely a simple apparatus by which the freshness of bread or other bakery products may be restored, or by means of which such products may be warmed quickly just before they are served to be eaten, and I shall confine the detailed description to this particular apparatus; since it will be obvious to those skilled in the art how the same principle can be applied to a cooking or baking utensil.

Reference being had to the drawing, 1 represents a horizontal steam pipe provided with a series of hollow needles, 2, distributed lengthwise thereof and projecting upwardly therefrom, each needle having at least one eye, 3, near the pointed end for the purpose of allowing the escape of steam, hot air or both, delivered to the needles by the steam pipe.

When it is desired to freshen or warm a loaf of bread, for example, the loaf is pressed down upon the needles so as to cause the pointed ends of the needles to extend well into the body of the loaf, such a loaf being indicated at the dotted lines at 4 in Fig. 1. When dry steam, or heated air, or both, is introduced into the steam pipe 1 under a small pressure, it travels up through the needles and is discharged into the loaf at a plurality of distributed points being disseminated through the loaf and retained within the same by the outer shell or crust. Thus in an extremely short time a large loaf of stale bread will be thoroughly freshened.

Since the size of bread loaves varies and it is desirable to have the steam discharge outlets in the needles at approximately the center of the loaf, a gage, 5, of any suitable kind may be provided for limiting the extent to which the needles may enter the loaf. This gage may consist of a simple flat plate, 5, perforated for the reception of the needles and having one or more set screws, 6, for locking it at any desired point along the needles. With this arrangement, after it has once been set for a given size of loaf, no particular care is required in placing the loaf in position, since it need simply be pressed down upon the needles until it strikes the gage, the steam or heated air being turned on for about half a minute, the loaf being then removed and replaced by another.

The same apparatus may be used for warming up small pastry products in restaurants, for the purpose of serving them in a warm state without producing a drying of the crust or shell. For this purpose the gage may be set close to the points of the needles because the needles need enter the food products only a short distance. I have found that these small bakery products can be warmed almost instantaneously so that there need be no delay in serving the customer.

The steam, hot air or mixture of steam and air may be supplied to the pipe 1 in any suitable way and be controlled in any suitable way. In the arrangement shown, the pipe 1 is inclosed within a larger pipe, 7, which is closed at one end and opens at the other end into a vertical section of pipe, 8, serving as a reservoir for condensed steam. Steam is supplied to the pipe 7 through a connection, 9, arranged between the upper portion of the pipe 8 and a suitable steam boiler, 10; the connection 9 having a suitable valve, 11, for shutting off the steam supply when desired. The end of the pipe 1 adjacent to the inlet end of the pipe 7 is closed while the opposite end of the pipe 1 is open. This makes it necessary for the steam to travel a considerable distance before reaching the needles and therefore allows it to free itself from any surplus moisture so that when it reaches the needles it will be in a dry state and will not make the food soggy.

While I have illustrated and described with particularity only a single preferred form of carrying out my improved method, I do not desire to be limited to the apparatus thus illustrated and described.

I claim:

1. The method of treating bread which consists in injecting a hot gas into the interior thereof.

2. The method of freshening food which consists in injecting dry steam into the interior thereof at a plurality of distributed points.

3. The process of freshening bakery products which consists in injecting minute streams of steam into the interior thereof.

4. The method of treating bakery products which consists in thrusting hollow perforated needles through the crusts thereof and admitting steam into the interior of the needles.

5. The method of treating bakery products which consists in injecting a hot gaseous fluid into the interior thereof at numerous distributed points.

In testimony whereof, I sign this specification in the presence of two witnesses.

WALTER H. TOMLINSON.

Witnesses:
 WM. F. FRENDENREICH,
 RUTH E. ZETTERVALL.